May 15, 1951     S. D. BRADLEY     2,553,076
FEEDING MEANS FOR PLASTIC FABRICATING MACHINES
Filed April 26, 1948
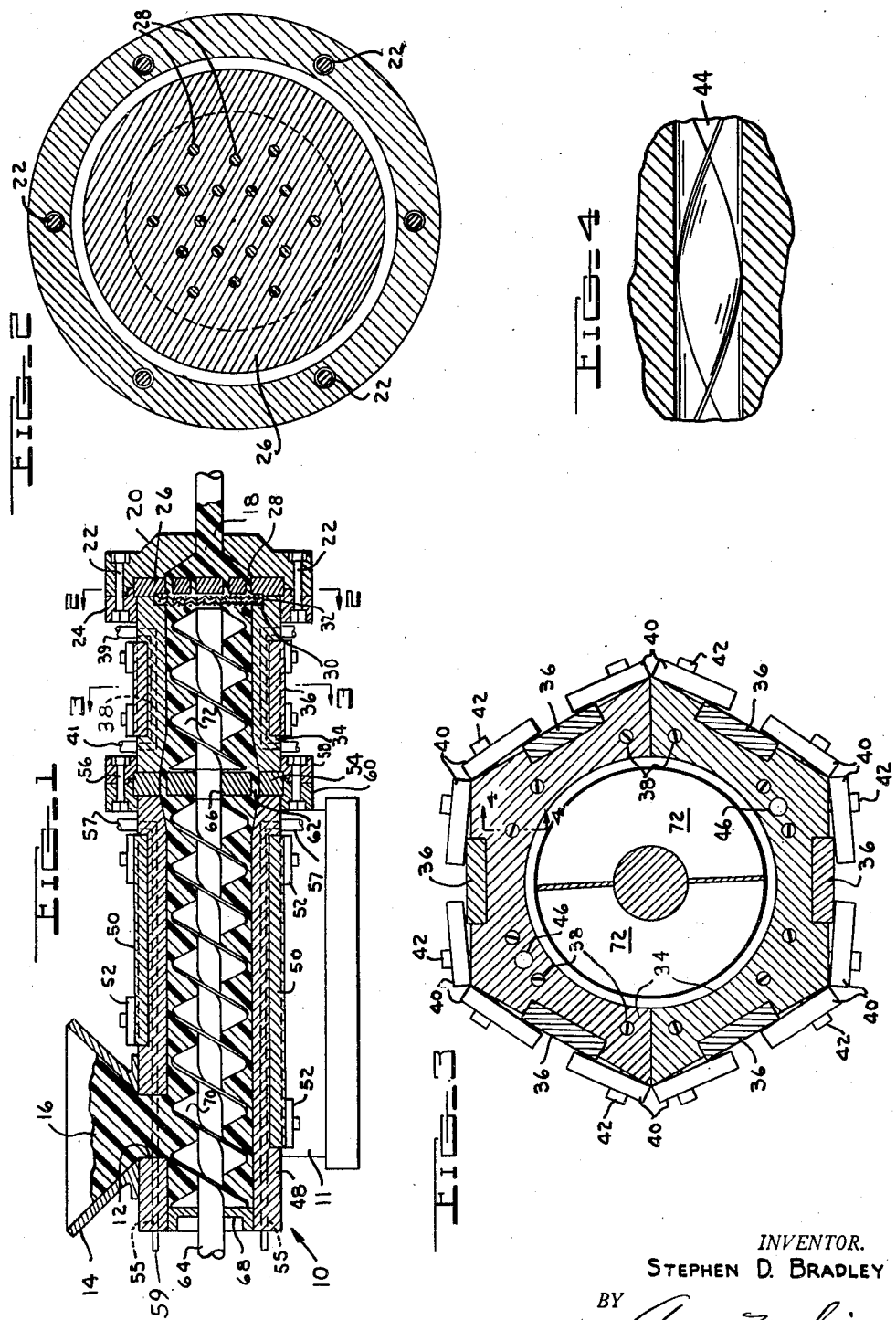
INVENTOR.
STEPHEN D. BRADLEY
BY
*Arthur M. Smith*
ATTORNEY Patented May 15, 1951

2,553,076

UNITED STATES PATENT OFFICE 2,553,076

FEEDING MEANS FOR PLASTIC FABRICATING MACHINES

Stephen D. Bradley, Detroit, Mich., assignor to Detroit Macoid Corporation, Detroit, Mich., a corporation of Michigan Application April 26, 1948, Serial No. 23,312

3 Claims. (Cl. 18—12)

The present invention relates to an improved feeding means for plastic fabricating machines, which may be used either as an attachment for existing plastic extrusion or injection molding machines, for example, or may be designed as an integral part of such machines.

Prior to the present invention, means for feeding thermoplastic material at a controlled temperature to the extrusion or injection molding head of plastic fabricating machines commonly comprised a tubular conduit having screw means therein for moving the plastic material from an inlet opening at one end of the conduit toward a discharge opening communicating with the fabricating die at the other end. Temperature control means cooperable with the feed conduit were also provided with the aim of heating the thermoplastic material, so that by the time it reached the region of the discharge opening, it would be softened and plasticized at the optimum temperature for proper fabrication. Within the conduit and disposed across the flow of plastic material adjacent the discharge opening were mounted screening means, usually comprising a series of fine mesh screen, for screening the plastic material before its entry into the die. A perforate steel breaker plate was placed between the discharge opening and screening means to reinforce the latter and to prevent its being forced through the discharge opening.

In such constructions, the screens and breaker plate serve two functions; namely (1) to hold back particles of plastic, which are not thoroughly heat softened and plasticized, until they are sufficiently softened to pass through the screening means, and (2) to hold back all of the plastic for sufficient time to permit a thorough mixing of the plastic particles by a "working" or kneading action therebetween. This latter action is particularly necessary with the vinyl co-polymers since their structure is somewhat similar to rubber and a definite working or mixing action is required to produce a satisfactory and homogeneous product. The working action of the plastic occurs to a limited extent along its screw-driven travel within the feed conduit, but occurs primarily at the screening means and in its movement through the orifices of the screens and breaker plate.

Certain thermoplastic materials, particularly if poorly compounded originally, require excessive screening in order to effect the necessary retardation and the working or mixing action to obtain a satisfactory homogeneous product. In such instances, a series of fine screens of 40, 60 and 80 mesh, i. e., holes per square inch, are commonly required. The excessive screening and retardation considerably reduces the output of the fabricating machine, and in addition holds back fine particles of dirt or impurities in the plastic. It is accordingly frequently necessary to stop the machine and change the screen, sometimes as often as every four hours. This operation alone requires between fifteen minutes and an hour, depending upon the complexity of the apparatus involved and the skill of the operator, thereby further reducing the operating efficiency of the machine by as much as twenty per cent in some instances.

Primary objects of the present invention are to provide an improved means for feeding thermoplastic material to a fabricating machine; and to effect a preliminary breakdown of the plastic particles and a working or mixing action therebetween at an intermediate location along the feed conduit, thereby permitting the feeding of the material to the fabricating machine in a thoroughly plasticized and homogeneous state and also materially increasing the output of the fabricating machine by decreasing the time interval required for the working or mixing action between the plastic particles.

Another object is to provide an improved feeding means of the character described which effects a rapid and thorough working action between the plastic particles, materially increasing the rate of output of the fabricating machine and permitting the production of a superior finished product.

Another object is to provide such a feeding means which permits the use of a relatively coarse mesh screening means adapted to pass fine impurities which apparently do not affect the finished product, thereby permitting the apparatus to work almost continuously without plugging the screen.

Other objects of this invention will appear in the following description and appended claims, reference being had to the accompanying drawings forming a part of this specification wherein like reference characters designate corresponding parts in the several views.

In the drawings:

Fig. 1 is a vertical longitudinal mid-section through a feeding apparatus embodying the present invention.

Fig. 2 is an enlarged vertical section through one of the breaker plates, taken in the direction of the arrows along the line 2—2 of Fig. 1.

Fig. 3 is an enlarged vertical section through the feed conduit with the plastic removed, taken in the direction of the arrows along the line 3—3 of Fig. 1.

Fig. 4 is an enlarged fragmentary vertical section taken longitudinally of one of the coolant ducts and in the direction of the arrows along the line 4—4 of Fig. 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A preferred embodiment of the present invention comprises a tubular feed conduit having screw means for conveying thermoplastic material from a feed hopper at one end of the tube to a discharge orifice at the other end. The latter communicates with the plastic fabricating equipment, such as an extrusion or injection molding head. Controlled heating means are provided along the length of the feed conduit for heating and softening the thermoplastic material. At an intermediate position between the feed hopper and the discharge opening is provided a supplementary steel perforate breaker plate, disposed across the direction of flow of the plastic along the feed conduit and providing a plurality of perforations through which the thermally softened plastic material is forced by the screw means.

The supplementary breaker plate effects a preliminary mixing and working action between the plastic material and a breakdown of the plastic particles during the course of their screw-driven movement along the feed conduit toward the discharge orifice. As the plastic material passes the supplemental breaker plate, the partially plasticized and "worked" particles are again picked up by the screw means and carried through an additional heating and working chamber toward the discharge opening. There the plastic material is forced through a screening means and a final steel perforate breaker plate, similar to the supplemental breaker plate and adapted to effect the final working or kneading and mixing action required to produce a satisfactory molded product.

By virtue of the supplemental breaker plate, the screening means required immediate prior to discharge of the plastic to the fabricating head may be materially reduced. Thus without sacrificing the required mixing and working of the plastic, a relatively coarse mesh screening means may be employed which offers less resistance to the flow of plastic and permits a marked increase in the rate of production over that formerly possible with conventional screening means.

The increased output permitted by the feed means of the present invention increases the problem of maintaining the plastic within the feed conduit at the uniform temperature required to maintain the viscosity of the plastic material within the close limits desired for a molded product of highest quality and to prevent possible overheating which in some cases would permanently damage the thermoplastic material. Various temperature control means may be employed with the feeding means of the present invention. A preferred temperature control means is described in my co-pending application Serial No. 23,311, filed April 26, 1948, now Patent No. 2,549,569 and provides a plurality of electrical heating elements embedded within the peripheral outer walls of the feed conduit. Runing longitudinally within the interior walls of the feed conduit and between its inner and outer peripheries are a plurality of ducts for a fluid coolant, which may be air or other suitable gas under pressure or a suitable liquid coolant. The cooling and heating systems are cooperably regulated by means of a thermostatically actuated control means having the thermosensitive elements embedded within the sidewalls of the feed conduit. By selectively actuating the heating and cooling systems in accordance with temperature changes in the feed conduit, the temperature of the thermoplastic material may be accurately maintained within narrow limits.

A particular feeding means embodying the present invention is shown by way of example in the drawings wherein a tubular feed conduit, indicated generally by the numeral 10 and mounted on the base 11, communicates at one end through an inlet opening 12 with a feed hopper 14 for the thermoplastic material 16. The other end of the feed conduit 10 is adapted for connection with the plastic fabricating apparatus, not shown, which may be a conventional extrusion or injection molding head for example, and provides the discharge opening 18 for communicating with the said fabricating apparatus.

The discharge orifice 18 is provided within the orifice plate 20, which is detachably secured by means of the plurality of bolts 22 to the annular collar flange 24 carried by the discharge end of the conduit 10. Recessed within the plate 20 and flange 24 is the circular perforate breaker plate 26, Fig. 2, having the plurality of perforations 28 adapted to permit passage of the material 16 from the conduit 10 to the discharge opening 18. The plate 26 also serves as a reinforcement for the screening means 30, recessed within the annular recess 32 at the discharge end of the tube 10. In general, the breaker plate 26 and screening means 30 are of conventional construction, with the exception that for any given plastic material, a coarser screening mesh than would previously have been feasible may be employed by virtue of the present invention described below.

The tubular feed conduit 10 in the present instance comprises two longitudinal portions joined end to end, one being an inlet portion connected with the hopper 14 and the other being a discharge portion communicating with the discharge orifice 18. Referring to Fig. 3, the discharge portion of the conduit 10 is comprised of two-part mating sidewall members 34 of thermal conductive material which enclose the tubular opening for the conduit 10. Accurate temperature control of the plastic 16 within the sidewalls 34 is achieved within the close limits desired by the cooperable action of the plurality of electric heating elements 36 and the coolant ducts 38 extending longitudinally of the sidewall members 34.

The heating elements 36 are preferably of the electric strip heater type partially embedded within the outer peripheral portions of the sidewalls 34 in heat exchange relation therewith and are detachably clamped in place by the plurality of clamps 40 secured to the sidewalls 34 by the screws 42. The coolant ducts 38 are provided within the sidewalls 34 interiorly of the heaters 36 and extend essentially radially near the ends of the sidewalls to provide inlet and discharge outlets 39 and 41 respectively for connection with an operative fluid coolant circuit, not shown. Thus, means are provided to dissipate excess heat rapidly from the sidewalls 34 and thereby to prevent overheating from the heaters 36 as might otherwise frequently happen as a result of intermittent flow of plastic 16 through the tube 10. The coolant ducts 38 are provided with spiral baffle ribbons 44 extending longitudinally thereof for retarding the flow of the coolant fluid.

In operation, the coolant ducts 38, together with the electric heating elements 36, are regulated by thermostatically actuated control means having the thermosensitive elements thereof embedded within the recesses 46 of the sidewalls 34. Various suitable thermostatically controlled circuits for selectively regulating the flow of coolant fluid through the ducts 38 and electric current through the heaters 36 in response to temperature changes of the sidewalls 34 are available for use with the present invention and are accordingly not described herein.

The inlet portion of the conduit 10 is mounted on the base 11 and is generally similar to the discharge portion shown in Fig. 3. It is comprised of the two-part thermal conductive sidewall members 48 adapted to enclose the tubular opening of the conduit 10. Similarly to the heaters 36, the electric strip heaters 50 are embedded within the outer peripheral sidewalls 48 and are held in place by the screw-bracket means 52. The sidewall members 34 and 48 are spaced by the supplemental breaker plate 54 and are joined in end to end relation by means of the plurality of bolts 56 extending through the flange collars 58 and 60 carried by the adjacent ends of the wall members 34 and 48 respectively. The several collars 24, 58 and 60 are secured to their respective sidewall members 34 and 48 by means not shown and firmly clamp the latter together in proper alignment and in mating pairs so as to prevent leakage of the material 16 at the various junctures.

The breaker plate 54, similar in construction to the breaker plate 26, Fig. 2, is recessed into the flange collars 58 and 60 and provides the plurality of perforations 62 having a total area equal to the total area of the perforations 28. In the present instance, the perforations 62 and 28 are circular with axes parallel to the axis of the screw shaft 64. Comparable openings of other shapes and having various angular dispositions relative to the axis of the shaft 64 may be employed where desired. It will also be apparent from the disclosure herein that one or more supplementary breaker plates similar to the plate 54 may be employed in series where desired.

The plastic 16 is conveyed from the opening 12 to the opening 18 by a screw conveyor having the longitudinally extending shaft 64 which projects through a central journal opening 66 within the breaker plate 54 and through the end closure plate 68 to a driving means not shown. The spiral conveyor blades 70 and 72 driven by the shaft 64 are separated into two units by the plate 54, one unit being disposed between the end closure plate 68 and the supplemental breaker plate 54, and the other unit being disposed between the supplemental breaker plate 54 and the screening means 30.

The tubular sidewall members 48 are constructed similarly to the sidewall members 34 and provide the longitudinally extending coolant ducts 55. The latter extend essentially radially through the right ends of the members 48 and provide the inlet openings 57 for connection with the aforesaid fluid coolant circuit. The other ends of the ducts 55 open longitudinally from the ends of the members 48 and provide the discharge openings 59 adapted for connection with the coolant circuit.

In operation of the apparatus described, the screw conveyor shaft 64 is rotated so as to drive the plastic material 16 from the hopper 14 toward the discharge outlet 18 as in conventional practice. As previously described, a certain amount of the working action or kneading of the plastic 16 is effected as it is moved along the conduit 10 by the screw conveyor blades 70—72. This working action in itself is not sufficient to permit satisfactory extrusion or injection molding. Accordingly, the breaker plate 26 and screening means 30 are provided adjacent the opening 18 and across the flow of material 16 to complete the working action and to prevent lumps of unplasticized material from reaching the fabricating head. In order to achieve the necessary working action between the plastic particles and to obtain the desired homogeneity and plasticity required for fabrication, conventional practice required a screening means of a relatively fine mesh which materially slowed the rate of output of the apparatus and frequently became clogged with fine particles of impurities within the plastic.

A novel concept of the present invention has been to provide the working action and particle breakdown at a point along the flow of the plastic material while it is still in the screw. To this end, the supplemental breaker plate 54 is provided at a central location between the screen 30 and the inlet opening 12. The plastic material 16 which has been heated and softened within the sidewalls 48 thus receives a preliminary working as it is forced through the orifices 62. In this connection, the perforations 62 are preferably located near the peripheral portions of the breaker plate 54 so as to cause an abrupt right angle change in direction in the flow of plastic particles as they strike the plate 54. It has been found that such a change of direction effects the most efficient working action of the plastic material 16. The plastic material 16 which has been broken down by passing through the breaker plate 54 is then picked up by the screw blades 72 and carried through the additional heating and working chamber within the sidewalls 34, thence through the screening means 30 and breaker plate 26.

Without being limited to any particular explanation for the superior results achieved by the present invention, it has been found by actual tests that the supplemental breaker plate 54 permits the use of a relatively coarse mesh screen 30 with the type of plastic material which heretofore required three screens of 40, 60 and 80 mesh respectively or a 24×120 Dutch weave filter screen, to effect the proper working action when the supplemental breaker plate 54 is not employed. When the latter is employed, a satisfactory and in some respects superior product is obtained using a relatively course 20 mesh screen.

In comparative tests, using similar plastic compounds from the same batch, and with the same extrusion die, the finished product using a 20 mesh screen and the supplemental breaker plate 54 permitted a superior finish as compared with products fabricated using conventional feeding means. The other physical properties of the products fabricated under the two test conditions were substantially the same within the limits of experimental error. In addition, the feeding apparatus of the present invention permitted an increased rate of output of approximately 80 per cent by eliminating the excessive retarding action of the fine mesh screen formerly required. Furthermore, by using the 20 mesh screen, fine impurities in the plastic, which apparently had no effect upon the finished product, passed through the screen without clogging, permitting essentially continuous production.

It is to be observed that with the marked increase in the rate of flow of the plastic 16 through the conduit 10, permitted by the feeding means of the present invention, the problem of maintaining the plastic 16 at a uniform temperture within the conduit 10 is considerably increased when the fabricating machine is subjected to intermittent operation. When the plastic 16 is flowing through the tube 10 at the maximum rate of flow, and the heaters 36 and 50 are operating at capacity, the sidewalls 34 and 48 will necessarily be considerably warmer than the desired optimum temperature of the plastic 16, so as to provide the necessary temperature gradient between the walls 34 and 48 and the plastic 16. Upon cessation of the flow of the plastic 16, the thermo-sensitive elements within the recesses 46 will experience a rise in temperature and will actuate the control circuit to de-energize the heaters 36 and 50. However, without a provision to the contrary, the residual heat within the walls 34 and 48 will continue to raise the temperture of the plastic 16. Overheating and possible permanent damage by discoloration or deterioration of the plastic 16 may result.

Overheating is avoided in the present invention by virtue of the thermostatically controlled coolant system, including the ducts 38 and 55. As the temperature of the sidewalls 34 and 48 rises above a predetermined safe value, the thermostatic elements within the recesses 46 operate to initiate the flow of the fluid coolant through the coolant duct system so as to convey the excess heat from the sidewalls of the conduit 10. In this respect, it is to be noted that the ducts 38 and 55 are disposed within the body of the sidewalls of the conduit 10 between the electric heating elements and the inner periphery of the conduit 10. Thus before the excess residual heat in the region of the heating elements 36 and 50 can contact the plastic 16, it is carried away by the fluid coolant.

By the foregoing, I have disclosed a novel and improved means for feeding thermoplastic material to plastic fabricating machinery, such as extrusion and injection molding equipment. The present invention permits an increased production with existing equipment, in some instances doubling the production obtained by the use of conventional feeding equipment. At the same time, the resulting product is comparable to that obtained by conventional feeding means and even permits a superior finish.

Having thus described my invention, I claim:

1. In a feed mechanism for a plastic fabricating machine, the combination of a tubular feed conduit having longitudinally spaced discharge and inlet openings for plastic material, means to effect a flow of the plastic material within said feed conduit toward said discharge opening, screening means within said feed conduit and disposed across said discharge opening, a perforate breaker plate disposed between said screening means and said discharge opening, and an unobstructed supplemental perforate breaker plate disposed within said feed conduit between said screening means and said inlet opening, said screening means being relatively coarse and of approximately 20 mesh and the openings in said screening means being smaller than the openings in said supplemental breaker plate.

2. The combination as claimed in claim 1 and being further characterized in that controlled heating means are provided for the plastic within said feed mechanism, and cooling means are provided to prevent overheating of said plastic and including conduit means for a fluid coolant and in heat exchange relationship with the plastic within said feeding means.

3. In a plastic fabricating machine feed mechanism having controlled heating and cooling means to regulate the temperature of plastic material used therein, the combination of a tubular feed conduit having an inlet and an outlet opening spaced longitudinally thereof, worm screw means for driving plastic within said feed conduit from said inlet opening toward said discharge opening, screening means adjacent said discharge opening and disposed across the flow of plastic within said feed conduit, a perforate breaker plate disposed between said discharge opening and said screening means and closely adjacent the latter for reenforcement thereof, and an unobstructed supplemental perforate breaker plate disposed across the flow of plastic within said feed conduit between said screening means and said inlet opening, said screening means being relatively coarse and of approximately 20 mesh and the openings in said screening means being smaller than the openings in said supplemental breaker plate.

STEPHEN D. BRADLEY.

REFERENCES CITED

The following references are of record in the file of this patent:

UNITED STATES PATENTS

| Number | Name | Date |
|---|---|---|
| 1,478,842 | Staley | Dec. 25, 1923 |
| 2,078,565 | Durst et al. | Apr. 27, 1937 |
| 2,262,989 | Conklin et al. | Nov. 18, 1941 |
| 2,378,539 | Dawihl | June 19, 1945 |

FOREIGN PATENTS

| Number | Country | Date |
|---|---|---|
| 507,926 | Great Britain | of 1939 |
| 240,500 | Switzerland | Apr. 16, 1946 |